March 1, 1949.   H. D. McSWINEY   2,463,406
MOTORCYCLE
Filed March 16, 1945   4 Sheets-Sheet 1
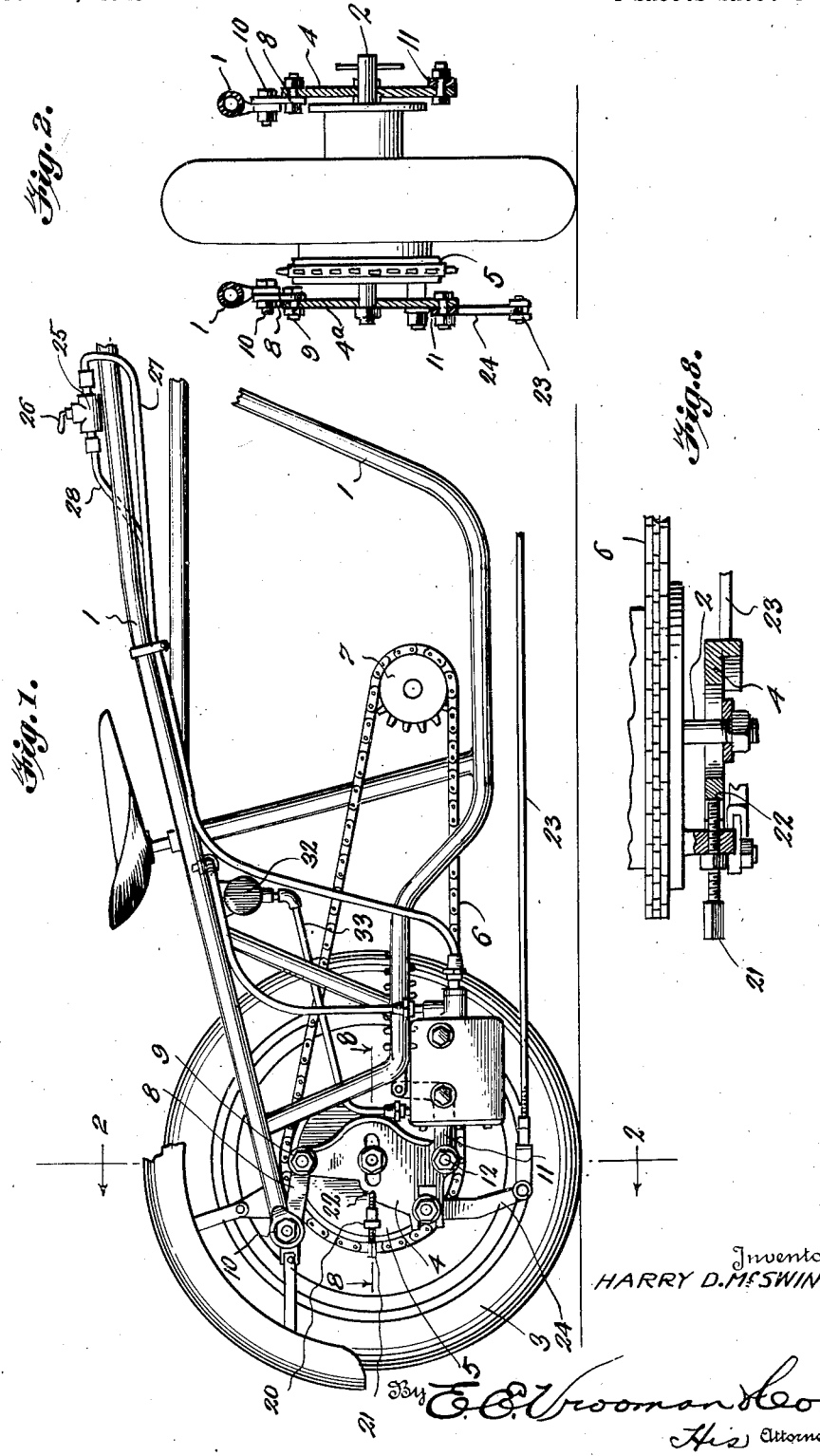
Inventor
HARRY D. McSWINEY March 1, 1949. H. D. McSWINEY 2,463,406
MOTORCYCLE
Filed March 16, 1945 4 Sheets-Sheet 2

Inventor,
HARRY D. McSWINEY.

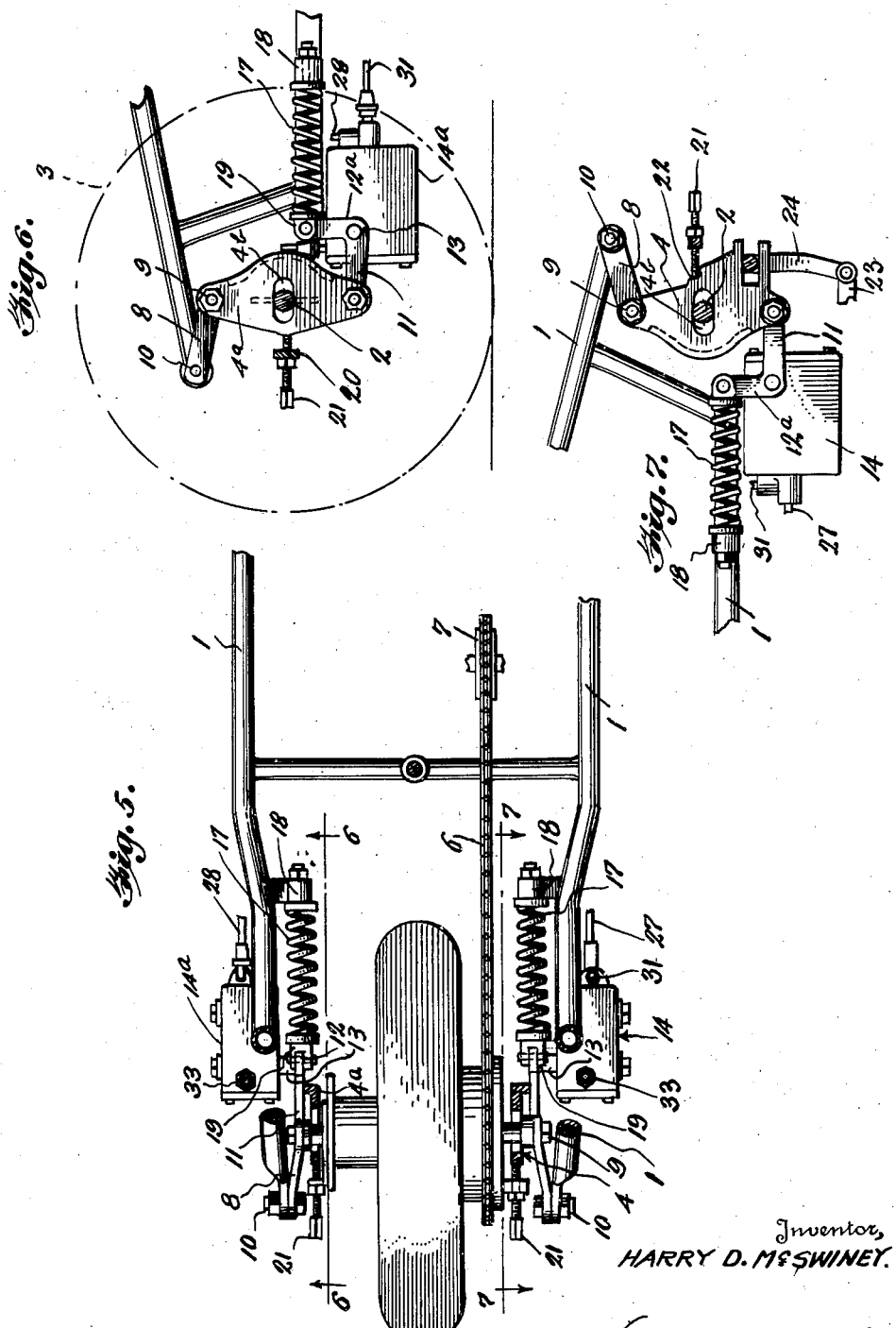

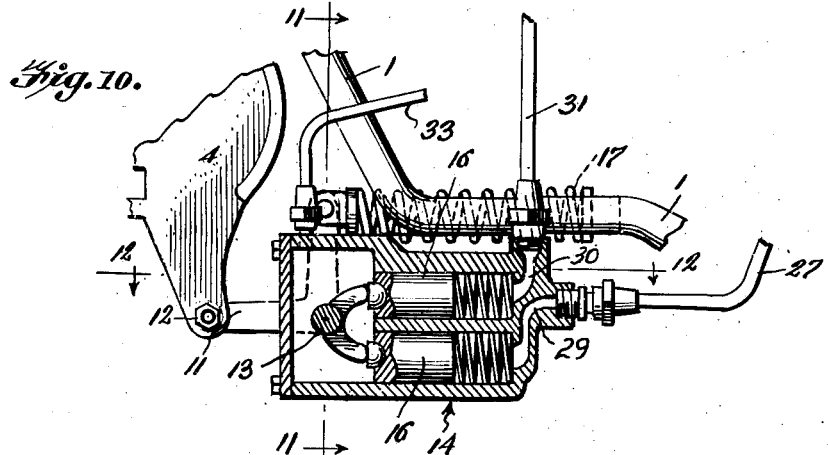
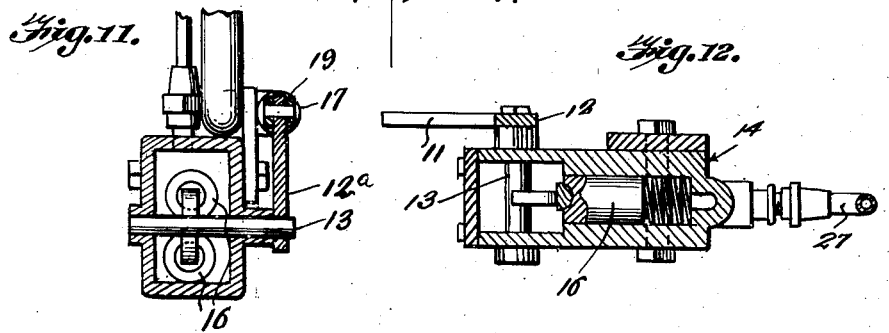
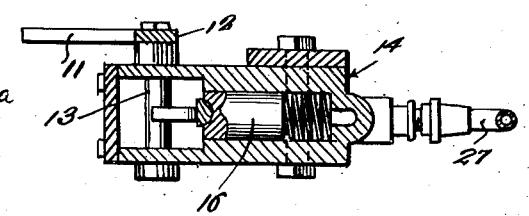
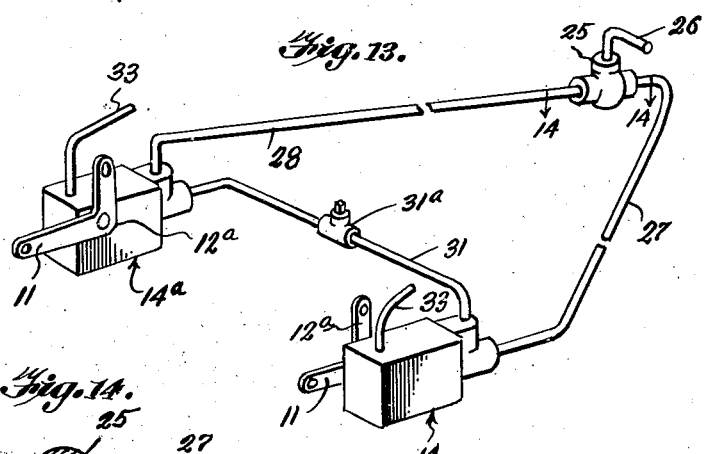
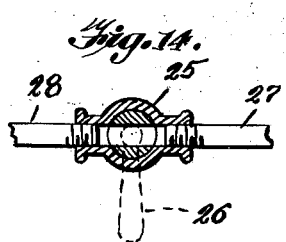

Patented Mar. 1, 1949

2,463,406

UNITED STATES PATENT OFFICE 2,463,406

MOTORCYCLE

Harry D. McSwiney, Nashville, Tenn.

Application March 16, 1945, Serial No. 583,077

3 Claims. (Cl. 280—285)

1

This invention relates to motorcycles and more particularly to a new type of rear-wheel springing.

An object of this invention is the construction of a mechanism which is hydraulically controlled by a small lever mounted close to the instrument panel requiring only a slight movement by the rider to operate. The hydraulic fluid also assures that the rear wheel shall move in a vertical plane.

Another object is the construction of a motorcycle with a rear wheel springing structure having carriage plates and rockers on its sides contiguous to the rear wheel. The arrangement of the rockers assures that the distance from the counter shaft sprocket to the rear axle shall remain constant as the rear wheel moves up and down.

With the foregoing and other objects in view, my invention comprises certain novel constructions, combinations and arrangements of parts as will be hereinafter fully described, illustrated in the accompanying drawings, and more particularly pointed out in the appended claims.

In the drawings:

Fig. 1 is a fragmentary view in side elevation of a motorcycle, showing my invention applied thereto.

Fig. 2 is a transverse sectional view taken on line 2—2, Fig. 1, and looking in the direction of the arrows.

Fig. 5 is a top plan view.

Fig. 6 is a vertical sectional view, taken on line 6—6, Fig. 5, and looking in the direction of the arrows.

Fig. 7 is a vertical sectional view, taken on line 7—7, Fig. 5, and looking in the direction of the arrows.

Fig. 8 is a horizontal sectional view taken on line 8—8, Fig. 1, and looking in the direction of the arrows.

Fig. 10 is an enlarged, vertical, longitudinal sectional view of the shock absorber.

Fig. 11 is a transverse sectional view, taken on line 11—11, Fig. 10, and looking in the direction of the arrows.

Fig. 12 is a horizontal sectional view, taken on line 12—12, Fig. 10, and looking in the direction of the arrows.

Fig. 13 is a diagram of the two shock absorbers and the oil pipes connected thereto.

Fig. 14 is a sectional view, taken on line 14—14, Fig. 13, and looking in the direction of the arrows.

Figure 4:
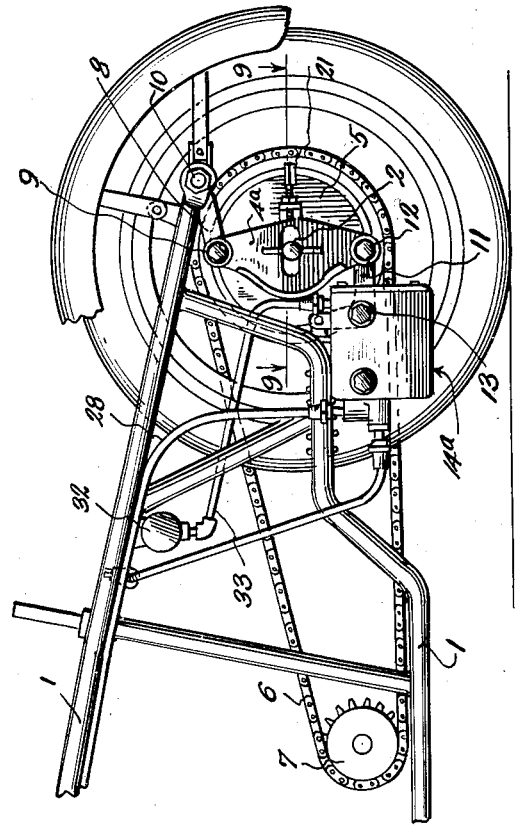
Fig. 4 is a view in side elevation, showing the left-hand side of the motorcycle.
Figure 9:
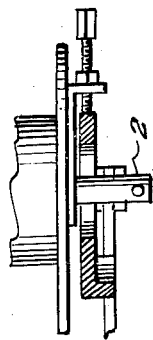
Fig. 9 is a horizontal sectional view, taken on line 9—9, Fig. 4, and looking in the direction of the arrows.
Figure 3:
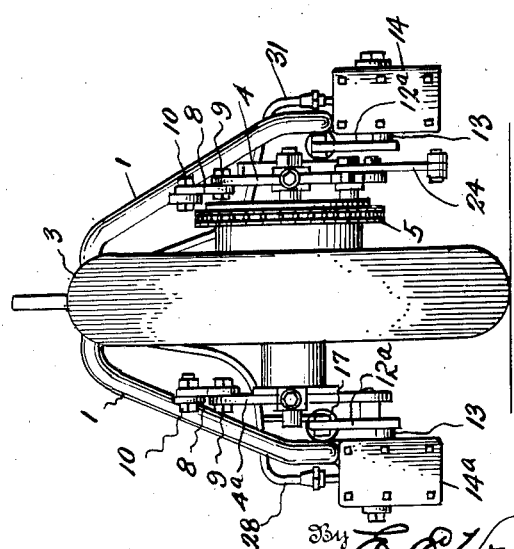
Fig. 3 is a rear view in elevation.

Referring to the drawings, in which I have shown the preferred embodiment of my invention, 1 designates the frame of the motorcycle, and 2 is the rear axle. The rear wheel 3 is mounted on the axle 2. A right-hand rotatable

2 rocker carriage plate 4 is mounted on the axle 2, as well as the brake plate 5 (Fig. 1), upon which is mounted sprocket chain 6. The motorcycle is provided with a drive sprocket 7, which is a unit of the transmission. The rotatable carriage plate 4 is pivotally connected to the frame 1 by rearwardly extending link 8; link 8 is pivotally connected at 9 to the upper end of carriage plate 4 and its other end is pivotally connected to frame 1 at 10. A rocker arm 11 is connected at 12 to the lower end of plate 4 and the opposite end of arm 11 is provided with a right angle extension 12ª (Fig. 7). On the lower end of extension 12ª is a shaft 13 (Fig. 10) which extends into the shock absorber casing 14. In casing 14 on shaft 13 is a U-shaped member which acts on pistons as wheel moves carriage plates up and down, which in turn actuates rocker 11 and causes extension 12 to act on spring as wheel moves up and down, these two pieces being connected pivotally at shaft 13. The pistons in the absorber are moved back and forth by U-shaped member which causes the flow of the fluid from one piston to the other through the system. The springing action then is controlled by how fast the fluid moves through the system which, of course, is controlled by valves 25 by moving lever 26. I will continue with the description of the oil system shown in Fig. 13: Taking for granted that the system is full of oil, when rocker 11 moves up, upper piston in casing 14 is pushed forward by U-shaped member. This forces oil through tube 31 into casing 14A and pushes lower piston in this member back against U-shaped member causing rocker 11 on left-hand side of machine to move up the same as rocker 11 on right-hand of machine, the pistons being of the same displacement. It is easily seen that this would cause the upper piston to move forward causing the fluid to flow through tube 28 through control valve 25 through tube 27 and to push lower piston in casing 14 backwards which would follow the movement of U-shaped member actuated by rocker 11 on right-hand of machine in the first place. In other words, when one rocker arm moves, the other rocker arm must move with it, liquid not being compressible. It is to be noted that both rocker plates 4 (Figs. 6 and 7) have horizontal, central, elongated apertures 4ᵇ through which shaft 2 extends.

The supply tank 32 is a means to keep the shock absorbers full of fluid. As you will notice, the fluid moves from this tank through tube 33 into shock absorbers in the small reservoir space back of the pistons. The wheel action causes the pistons to move backward and forward and with this type of absorber the liquid is pumped by this motion of the pistons from the reservoir back of the pistons out into the system when it is needed. With an absorber designed for this machine the extra supply tank 32 and supply lines 33 would not be necessary. In addition to this, the shock absorbers, control lines and all the hydraulic system could be removed from the machine and the rear wheel springing could still be used. Also the absorbers could be used with orifices instead of the control lines, as is common in automotive practice. A coil spring 17 is positioned between the support 18 on frame 1 and support 19 on the upper end of extension 12. This spring 17 serves to hold weight of machine.

On the left side of the motorcycle is a shock absorber casing 14a into which extends another shaft 13, which shaft is connected to the vertical or right angle extension 12 of the arm 11, the same in structure as described for the right side of the machine, Fig. 1. A second rotatable carriage plate 4a is provided on this left side of the machine, which plate is mounted on the axle 2. On brake plate 5 on right-hand side is a bracket 20 carrying a bolt 21; inner end of bolt 21 engages a notch 22 on plate 4a. This structure is for chain adjustment.

The usual brake rod 23 is provided, connected at its inner end to arm 24, Fig. 1, and arm 24 is connected to the usual brake means not shown.

A control valve 25 is placed close to instrument panel and is provided with a handle 26. Leading from valve 25 are two pipes 27 and 28. Pipe 27 is connected to the passage 29, Fig. 10, of the casing 14 at the right side of the motorcycle, while pipe 28 is connected to the upper passage 30 (Fig. 10) of the shock absorber 14a at the left-hand side of the motorcycle. A pipe 31 (Fig. 13) is connected to the top of the casing 14, while its other end is connected to the bottom of casing 14a. By this connection of said pipes 27, 28 and 31, the oil passes into casing 14 and through same in a reverse manner to the way the oil passes through casing 14a. When the handle 26 is in a neutral position on valve casing 25, the oil circulates freely through the system, permitting full capacity of springing action of the rear wheel, through the medium of the rocker arms 11 and carriage plates 4. However, by the operator turning handle 26, slowing up of the circulation of the oil through the system may be caused, retarding the free action of the pistons in the shock absorber casings, resulting in there not being as much springy action of the rear part of the motorcycle, and when the handle 26 is moved to what is known as a closed position, the circulation of the oil in the system will be stopped, thereby locking the motorcycle from having any springy action.

The oil supply tank 32 is provided, which is connected by pipes 33 (Fig. 13) to the top of the casings 14 and 14a, whereby these casings are supplied with oil, to maintain their efficiency.

The unit 31a is for the purpose of bleeding air from pipe lines.

From the foregoing description, it will be understood that both sides of the wheel carriage are bound to travel together, insuring perfect alignment of the rear wheels at all times. Further, the drive chain 6 does not loosen or tighten, by reason of my novel structure, during the operation of the motorcycle.

While I have described the preferred embodiment of my invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claims.

What I claim is:

1. In a motorcycle, the combination with a frame, a rear axle, a wheel on said axle, of carriage plates, said rear axle extending through the center of said carriage plates, whereby said carriage plates are rotatably mounted on said axle, rearwardly-extending links connected at their forward ends to said plates and at their rear ends directly to said frame, forwardly-extending angle rocker arms connected at their lower ends to the lower ends of said carriage plates, means pivotally connecting said rocker arms to said frame, spring means connected to the upper ends of said angle rocker arms, and means also connecting said spring means to said frame.

2. In a motorcycle, the combination with a frame, a rear axle, a wheel on said axle, of carriage plates provided within their marginal edges and at their centers with horizontal elongated apertures, said axle extending through said elongated apertures, rearwardly extending links connected at their forward ends to said plates and at their rear ends directly to said frame, a brake plate on said axle contiguous to one of said carriage plates, adjusting means on said brake plate and engaging an outer edge of the carriage plate in alignment with the elongated aperture, forwardly extending angle rocker arms connected at their lower ends to said carriage plates, means pivotally connecting said rocker arms to said frame, spring means connected to the upper ends of said angle rocker arms, and means also connecting said spring means to said frame.

3. In a motorcycle, the combination with a frame, a rear axle, a wheel on said axle, of carriage plates provided within their marginal edges and at their centers with horizontal elongated apertures, said axle extending through said elongated apertures, rearwardly extending links connected at their forward ends to said plates and at their rear ends directly to said frame, a brake plate on said axle contiguous to one of said carriage plates, said last mentioned carriage plate provided with a notch in its rear edge, said brake plate provided with a lug, a screw threaded through said lug and having its inner end extending into said notch, forwardly extending angle rocker arms connected at their inner ends to said carriage plates, means pivotally connecting said rocker arms to said frame, spring means connected to the upper ends of said angle rocker arms, and means also connecting said spring means to said frame.

HARRY D. McSWINEY.

REFERENCES CITED

The following references are of record in the file of this patent:

UNITED STATES PATENTS

| Number | Name | Date |
|---|---|---|
| 667,594 | Soucy, Jr. | Feb. 5, 1901 |
| 702,992 | Pecor | June 24, 1902 |
| 1,042,136 | Mershon et al. | Oct. 22, 1912 |
| 1,064,215 | Herman | June 10, 1913 |
| 1,149,432 | Escherich | Aug. 10, 1915 |
| 1,173,770 | Compton | Feb. 29, 1916 |
| 1,470,301 | Tappen et al. | Oct. 9, 1923 |
| 1,721,732 | Hawkins | July 23, 1929 |
| 1,865,896 | Gillet | July 5, 1932 |
| 2,218,634 | Best | Oct. 22, 1940 |
| 2,257,913 | Maranville | Oct. 7, 1941 |
| 2,333,095 | Dowty | Nov. 2, 1943 |